United States Patent
Gelli et al.

(10) Patent No.: US 8,007,639 B2
(45) Date of Patent: Aug. 30, 2011

(54) SYSTEM FOR PRODUCING AN ARTICLE MADE OF TISSUE PAPER OR THE LIKE COMPRISING A SUPERABSORBENT MATERIAL

(75) Inventors: Mauro Gelli, Capannori (IT); Mauro Marsili, Lucca (IT); Fabio Giachetti, Cascina (IT)

(73) Assignee: Fabio Perini S.p.A., Lucca (IT)

( * ) Notice: Subject to any disclaimer, the term of this patent is extended or adjusted under 35 U.S.C. 154(b) by 881 days.

(21) Appl. No.: 11/795,688

(22) PCT Filed: Jan. 17, 2006

(86) PCT No.: PCT/IT2006/000024
§ 371 (c)(1),
(2), (4) Date: Jul. 20, 2007

(87) PCT Pub. No.: WO2006/077613
PCT Pub. Date: Jul. 27, 2006

(65) Prior Publication Data
US 2008/0115898 A1  May 22, 2008

(30) Foreign Application Priority Data
Jan. 21, 2005  (IT) .............................. FI2005A0011

(51) Int. Cl.
*D21H 27/32* (2006.01)
*B31C 11/00* (2006.01)
*B26D 1/00* (2006.01)
*B31F 1/07* (2006.01)
*B05C 5/00* (2006.01)

(52) U.S. Cl. ........ 162/265; 162/283; 162/286; 162/362; 162/368; 156/349; 156/459; 156/502; 156/529; 156/547

(58) Field of Classification Search .......... 162/265–266, 162/283, 286, 289, 361–363, 368; 156/349, 156/459, 467, 502, 507, 522, 529, 543
See application file for complete search history.

(56) References Cited

U.S. PATENT DOCUMENTS

| | | | |
|---|---|---|---|
| 3,489,464 A * | 1/1970 | Delfs | 406/28 |
| 4,586,854 A * | 5/1986 | Newman et al. | 406/153 |
| 4,600,458 A * | 7/1986 | Kramer et al. | 156/199 |
| 4,715,918 A | 12/1987 | Lang | |
| 4,812,086 A * | 3/1989 | Kopernicky | 406/153 |
| 5,139,841 A * | 8/1992 | Makoui et al. | 428/109 |
| 5,294,217 A * | 3/1994 | Talacko et al. | 406/91 |
| 5,916,670 A | 6/1999 | Tan et al. | |
| 6,572,735 B1 * | 6/2003 | Wallajapet et al. | 162/115 |
| 7,211,171 B2 * | 5/2007 | Reinheimer et al. | 162/117 |
| 7,407,558 B2 * | 8/2008 | Kaylor | 156/247 |
| 7,523,884 B2 * | 4/2009 | Gelli et al. | 242/521 |
| 2002/0068081 A1 * | 6/2002 | Fontenot et al. | 424/443 |
| 2003/0044585 A1 * | 3/2003 | Taylor et al. | 428/195 |
| 2003/0059580 A1 | 3/2003 | Durand et al. | |
| 2003/0127202 A1 * | 7/2003 | Reinheimer et al. | 162/124 |
| 2003/0149415 A1 | 8/2003 | Wallajapet et al. | |

(Continued)

FOREIGN PATENT DOCUMENTS

| | | | |
|---|---|---|---|
| DE | 2351176 A | * | 4/1974 |
| DE | 102008056369 A1 | * | 5/2010 |
| EP | 223660 A1 | * | 5/1987 |

(Continued)

*Primary Examiner* — Jose A Fortuna
(74) *Attorney, Agent, or Firm* — Breiner & Breiner, L.L.C.

(57) ABSTRACT

A method for producing an article made of a web material, comprising at least one ply, wherein a superabsorbent material in powder form is associated with said ply.

20 Claims, 1 Drawing Sheet

U.S. PATENT DOCUMENTS

| | | | |
|---|---|---|---|
| 2003/0200991 A1* | 10/2003 | Keck et al. | 134/6 |
| 2005/0224200 A1* | 10/2005 | Bouchard et al. | 162/123 |
| 2006/0005919 A1* | 1/2006 | Schewe et al. | 156/276 |
| 2007/0092700 A1* | 4/2007 | Maddaleni et al. | 428/174 |
| 2007/0184246 A1* | 8/2007 | Nencioni et al. | 428/156 |
| 2008/0115898 A1* | 5/2008 | Gelli et al. | 162/109 |
| 2008/0115903 A1* | 5/2008 | Gelli et al. | 162/357 |
| 2008/0128101 A1* | 6/2008 | Furman et al. | 162/158 |
| 2008/0236773 A1* | 10/2008 | Gelli et al. | 162/123 |
| 2009/0101748 A1* | 4/2009 | Maddaleni et al. | 242/541.2 |
| 2010/0025515 A1* | 2/2010 | Gelli et al. | 242/521 |
| 2010/0101185 A1* | 4/2010 | Maddaleni et al. | 53/430 |

FOREIGN PATENT DOCUMENTS

| | | |
|---|---|---|
| EP | 0 264 676 A1 | 4/1988 |
| EP | 1 325 981 A1 | 7/2003 |
| EP | 1 327 716 B1 | 10/2006 |
| SU | 477846 A * | 8/1975 |
| WO | WO 01/13966 A1 | 3/2001 |
| WO | WO 01/14641 A1 | 3/2001 |
| WO | WO 0144576 A1 * | 6/2001 |
| WO | WO 03/057990 A1 | 7/2003 |
| WO | WO 2005/098134 A1 | 10/2005 |
| WO | WO 2006077611 A1 * | 7/2006 |
| WO | WO 2006077613 A1 * | 7/2006 |

* cited by examiner

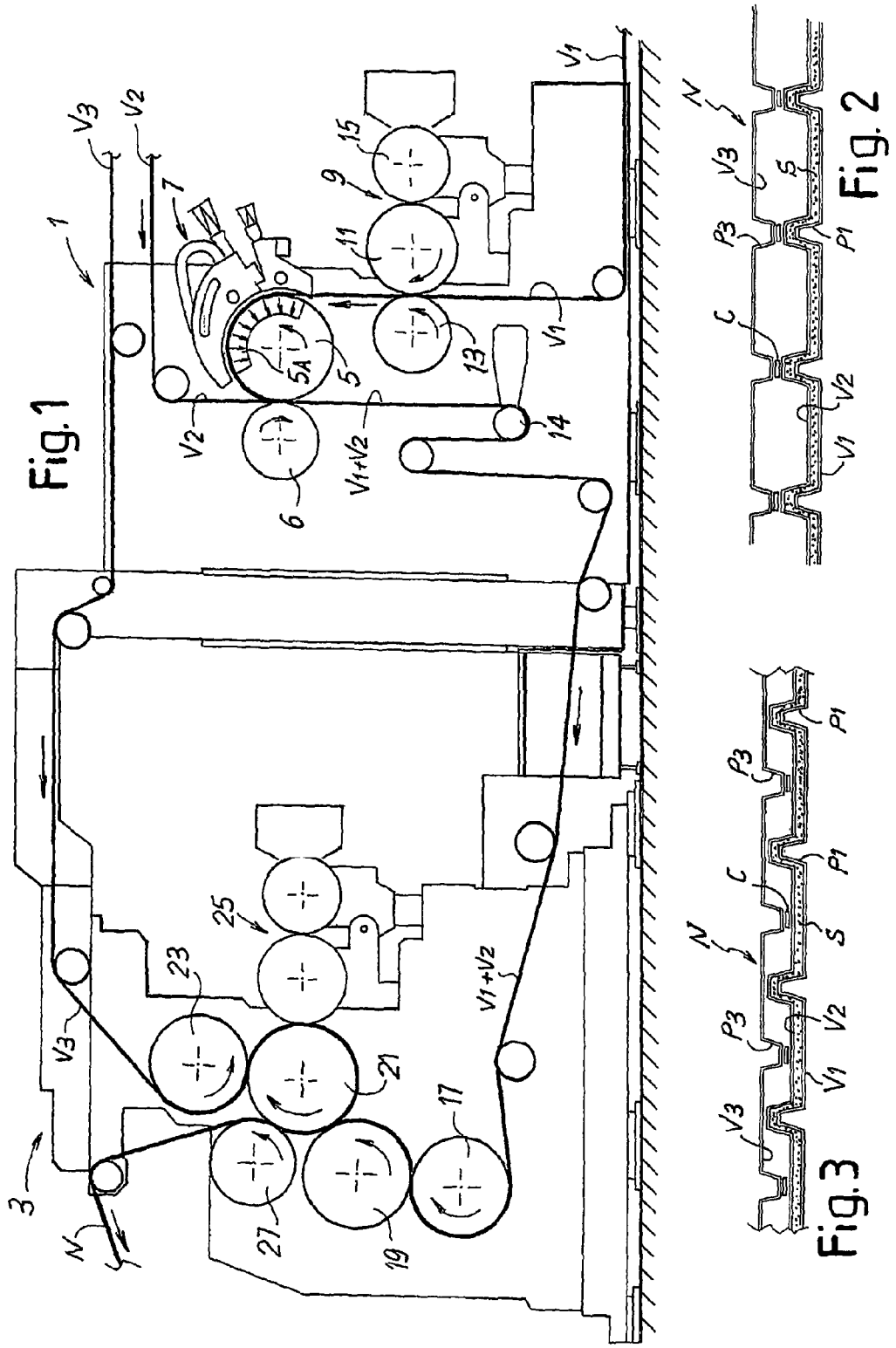

SYSTEM FOR PRODUCING AN ARTICLE MADE OF TISSUE PAPER OR THE LIKE COMPRISING A SUPERABSORBENT MATERIAL

TECHNICAL FIELD

The present invention relates in general to the production of articles in sheet form, in particular articles composed of one or more plies of paper and in particular of tissue paper, associated with superabsorbent materials to increase the absorption capacities of the end product.

STATE OF THE ART

Paper products composed of one or more plies of tissue paper, also called crimped paper, are used in many domestic and industrial applications. The term tissue paper is intended as a paper with noteworthy softness and absorption capacity. Typically, this paper is used to produce paper napkins, paper handkerchiefs, toilet paper, kitchen paper, facial tissues, industrial products of various types and similar products.

The capacity to absorb liquids is one of the important characteristics of these products.

In order to increase this characteristic, it has been suggested to combine the cellulose material, forming the basis of the ply or plies of the articles in question, with superabsorbent materials, in particular superabsorbent polymers, in the form of fibers or powders. According to a first approach (see WO-A-0114641) particles in the form of superabsorbent fibers or powders are mixed in an aqueous suspension also containing the fibers with which the paper plies are subsequently formed. In substance, this requires addition of the superabsorbent materials in the wet phase of the production cycle of the paper plies, with consequent drawbacks, firstly deriving from the need to bring the superabsorbent materials into contact both with the water and with the pulp to produce paper. This circumstance can cause damages to the superabsorbent materials and a noteworthy reduction in their absorbent power. There are also consequences with regard to the microstructure of the paper ply, as voids form inside the ply after elimination of the water from the superabsorbent materials incorporated in the pulp in the subsequent drying step. To eliminate water from the paper plies, a considerable amount of energy is required, due to the high content of water in the superabsorbent materials: the quantity of water which must be evaporated is much greater than a normal tissue paper without superabsorbent materials therewithin. This circumstance can also require the modification of production plants.

It has been suggested, to remedy these drawbacks, to interpose the superabsorbent material between two preformed and previously dried plies of paper (see WO-A-03057990, EP-A-1325981, EP-A-1327716, US-2003/0127202). In this case, the superabsorbent materials used are in the form of fibers and in particular, according to the aforesaid publications, fibers of a considerable length, typically between 3 and 30 mm. This makes it necessary to use particularly complex dosing devices, which distribute the superabsorbent fibers in the lamination nip of an embossing-laminating device. The use of superabsorbent fibers applied through distribution on preformed and dried plies is critical, as to obtain a high quality end product it is necessary to guarantee a noteworthy evenness of distribution of the superabsorbent material, that is, a quantity in weight per surface unit which is as even as possible. Uneven distribution of the superabsorbent fibers causes uneven thickness of the end product. If this can be acceptable for certain products (i.e. diapers) it cannot for others, for example very thin products wound in rolls or folded and packaged in packets, where in both cases an unevenness thickness of the compound sheet—subsequently wound or folded—would cause uneven thickness in the end product to be placed on the market. The use of fibers, and in particular fibers of the length described in prior art, implies causes difficulties from this viewpoint.

The use of fibers rather than granular particles is considered essential in prior art documents due to the need to avoid dispersal of superabsorbent material into the environment during production and during use. This is important for reasons related to the cost of the material and also regarding pollution, as the superabsorbent materials normally used for these purposes can be harmful both for the environment and for health.

The use of superabsorbent materials in powder or granules is known in the field of manufacturing of absorbent articles, such as baby diapers, feminine sanitary napkins, incontinence pads and the like. In this case the plies inside which the superabsorbent materials are inserted have a particularly high grammage (i.e. weight per surface unit), typically greater than $100 \text{ g/m}^2$, with consequent high product thickness. The granules of superabsorbent material used have relatively large dimensions, in view of the fact that they are inserted in articles of considerably thickness.

An example of application of superabsorbent materials in articles for the production of sanitary napkins, diapers and the like is described in U.S. Pat. No. 6,572,735, US-A-2003/0149415 and in WO-A-0113966. Another absorbent material with a weight per surface unit greater than $100 \text{ g/m}^2$ and up to $500 \text{ g/m}^2$ to be used to produce sanitary napkins, diapers and analogous products is described in U.S. Pat. No. 5,916,670.

SUMMARY OF THE INVENTION

The object of the invention is to improve the methods, systems and products in the technological field indicated above. In particular, the present invention relates to a system and a method for producing a paper article made of tissue paper or nonwoven fabric, single-ply or multi-ply, in particular for producing kitchen paper, toilet paper, napkins, handkerchiefs, facial tissues industrial products or analogous products, with the use of superabsorbent materials which overcome or reduce, entirely or in part, the drawbacks of prior art. A further object of the invention relates to the products obtained with said systems and methods.

According to a first aspect of the invention, a method is provided for producing a single-ply or multi-ply article preferably made of tissue paper (or nonwoven fabric), wherein a superabsorbent material in powder form is distributed on the first ply (if single-ply) or between the plies (if multi-ply) of previously dried tissue paper. In a possible embodiment of the invention, the particle size of the superabsorbent material used is such that the particles have dimensions (i.e. diameters) typically of up to 200 μm. More specifically, according to an advantageous embodiment, the superabsorbent material is composed of a powder whose particle size is such that a percentage of at least 98% in weight of the powders has a diameter no greater than 60 μm.

Typically, each ply forming the article has a grammage preferably no greater than $100 \text{ g/m}^2$ and even more preferably no less than $10 \text{ g/m}^2$.

Further advantageous characteristics of the method according to the invention will be described in greater detail hereunder, with reference to non-limiting embodiments of the invention.

According to a different aspect, the invention relates to a system to produce a multi-ply tissue paper article, in particular toilet paper, kitchen paper, napkins, handkerchiefs, facial tissues industrial products or the like, comprising in combination: a section for distribution of a superabsorbent material in powder on a first ply of tissue paper or nonwoven fabric, said section comprising applicator means for the superabsorbent powder; at least two paths for at least two paper plies, and means to join said plies and to produce a finished multi-ply tissue paper article. Typically, according to a preferred embodiment of the invention, the production line comprises an embossing unit and preferably an embossing-laminating unit, for embossing and joining, i.e. reciprocal combining, the first ply on which the superabsorbent material has been distributed with at least a further ply, of nonwoven fabric or preferably tissue paper.

According to a further aspect the invention relates to a system for producing a single-ply tissue paper or nonwoven fabric article, in particular toilet paper, kitchen paper, napkins, handkerchiefs, facial tissues industrial products or the like, comprising in combination: a section for distribution of a superabsorbent material in powder form on a ply of tissue paper or nonwoven fabric; a path for the paper ply; and means to make the superabsorbent material adhere to the ply and to produce a finished article with a single-ply sheet of tissue paper or nonwoven fabric.

Moreover, according to the invention a product in sheet form is provided, comprising at least one ply to which a superabsorbent material in powder form is applied. In particular, the product according to the invention is produced with one or more plies of tissue paper and can be a product in the form of a folded sheet (such as a handkerchief or the like) or in the form of a sheet wound in a roll.

Advantageously, the product comprises two plies, preferably made of tissue paper, joined to each other, between which said superabsorbent material in powder form is positioned and constrained. Advantageously and preferably the product has a grammage no greater than 100 $g/m^2$ and preferably no greater than 80 $g/m^2$. Advantageously, each ply of said product has a grammage no greater than 100 $g/m^2$. The quantity of superabsorbent material is greater than 0 $g/m^2$ and preferably less than 10 $g/m^2$, preferably between 0.1 and 10 $g/m^2$ and even more preferably between 0.4 and 2.4 $g/m^2$.

The dimension of the powders is preferably equal to or less than 200 micrometers and preferably at least 98% of the powders has a particle size no greater than 60 micrometers. Advantageously, the superabsorbent powders are composed of an edible product.

Further characteristics and advantageous embodiments of the system, of the method and of the products according to the invention are indicated in the appended claims and will be described in greater detail hereunder with reference to non-limiting examples of embodiment.

BRIEF DESCRIPTION OF THE DRAWINGS

The invention will be better understood by following the description and accompanying drawing, which shows non-limiting examples of embodiment of the invention. More specifically, in the drawings, where the same numbers are used to indicate the same or corresponding parts in the various figures:

FIG. 1 shows a diagram of a system for producing a multi-ply article; and

FIGS. 2 and 3 show schematic and enlarged cross sections of a multi-ply product.

DETAILED DESCRIPTION OF PREFERRED EMBODIMENTS OF THE INVENTION

FIG. 1 schematically shows a portion of a possible system or production line for producing a single-ply or multi-ply tissue paper article incorporating a superabsorbent material.

Superabsorbent material is intended in general as a material that is capable of absorbing a quantity of liquids in weight of at least 10 times its own weight. The superabsorbent material can be an inorganic superabsorbent material such as absorbent clay or silica gel. Alternatively, both natural and synthetic superabsorbent materials of organic nature, such as agar, pectin, guar gum and synthetic hydrogel polymers can be used. These can include the salts of alkaline metals, polyacrylic acids, polyacrylamides, polyvinyl alcohol, polyvinyl ether, carboxymethylcellulose, hydroxypropyl cellulose, polyvinylmorpholinone, copolymers of maleic anhydride and ethylene, polymers of maleic anhydride and isobutylene, polymers and copolymers of vinylsulfonic acid, polyacrylates, polyacrylamides, polyvinylpyridine and the like. Amides optionally grafted with hydrolyzed acrylonitrile or acrylic acid, and mixtures of two or more of the aforesaid substances could also be used. More generally, various products already in use as components of diapers or sanitary napkins can also be used as superabsorbent materials.

With reference to FIG. 1, the number 1 indicates as a whole a first section for distribution of the granular particles of superabsorbent material, and 3 indicates an embossing unit or more precisely a so-called embossing-laminating unit, i.e. a unit which embosses the plies of tissue paper and joins them by gluing. Along the portion of system shown in FIG. 1, three distinct paths extend for three plies of paper material. A first ply, indicated with V1, passes through the section 1 and is coupled, upon delivery from this section, with a second ply V2. The two plies V1, V2 are subsequently fed to the embossing-laminating unit 3, which receives a third ply of tissue paper V3. The assembly of plies V1, V2 are embossed and joined by lamination to the third ply V3, also embossed in the unit 3. The structure of the individual portions 1 and 3 of the system will be described in greater detail hereunder.

The section 1 is provided with a roller 5 with a perforated cylindrical surface. Disposed inside the roller 5 is a suction chamber 5A, extending for a portion of the circumferential extension of the roller, to define a suction sector 5A in a fixed position along the cylindrical surface of the roller 5.

A counter-pressure roller 6 cooperates with the roller 5 and both the ply V1 and the ply V2 are fed into the nip between the rollers 5 and 6. The ply V1 is fed by an angle of approximately 180° around the roller 5.

A device 7, for example a cyclone, to distribute the powders of superabsorbent material is positioned around the roller 5. The device 7 forms a storage chamber, in which the particles of superabsorbent material, dosed by a dosing device of a type known per se, not shown, are held in suspension in a flow of air. Suction through the perforated casing of the roller 5 and through the ply V1 along the extension of the suction sector 5A of said roller 5 causes attraction of the particles or powders of superabsorbent material in suspension in the gaseous flow towards and against the outward facing surface (i.e. not in contact with the roller 5) of the ply V1. Here the particles are constrained in part through penetration (caused by suction) between the fibers forming the ply and in part by means of a glue, optionally previously applied to said surface of the ply V1 by a gluing unit 9, positioned upstream of the area for distribution and application of the particles of superabsorbent material by the applicator means comprising, in this example, the device 7 and the suction roller 5.

The gluing unit 9 has a glue applicator roller 11, which cooperates with a counter-pressure roller 13. The ply V1 is fed into the nip between the rollers 11 and 13 and receives, on the side thereof facing the glue dispensing roller 11, an adequate quantity of glue to cause at least partial adhesion of the granular particles of superabsorbent product. The roller 11 can be a patterned roller, or it can receive the glue according to a pattern produced on a distributor roller 15, which picks up glue from a tank and distributes it on the cylindrical surface of the roller 11. This allows glue to be distributed according to predetermined areas and not over the entire surface of the ply V1.

With adequate distribution of the particles of superabsorbent material, strips or bands of ply V1 can be provided devoid of particles or powders of superabsorbent material. These bands or strips devoid of superabsorbent material can coincide with the cutting planes along which the rolls or logs formed by winding of the plies V1, V2 and V3 are subsequently cut, as better explained hereunder, to form rolls or folded finished products intended for distribution and consumption. In this way the powders or granular particles of superabsorbent material are not distributed in the areas in which the cutting blade acts to divide the web material formed by coupling of the plies V1, V2, V3. The absence of these powders in the cutting area reduces wear on the blade and possible dispersal of particles into the surrounding environment, with evident savings in the costs of powders and absence of environmental risks.

The pressure exerted between the rollers 5 and 6 causes reciprocal adhesion of the plies V1 and V2, thanks to the glue applied by means of the dispenser 9.

The assembly formed by the plies V1 and V2 and by the superabsorbent material in powder form distributed therebetween is fed along a feed path to the embossing-laminating unit 3. Here the assembly V1, V2 with the superabsorbent material interposed is fed around a pressure roller 17, optionally coated in rubber or another yielding material, cooperating with a first embossing roller 19, which is provided on the surface thereof with protuberances of a suitable shape, advantageously truncated pyramid shaped protuberances, distributed according to a suitable pattern on the circumferential extension of said roller 19.

The embossing roller 19 forms a lamination nip with a second embossing roller 21, which cooperates with a pressure roller 23 equivalent to the roller 17. A third ply V3 is fed around the pressure roller 23 and then into the nip formed between said roller 23 and the second embossing roller 21.

With this arrangement the ply V3 is embossed by the protuberances provided on the embossing roller 21, while the assembly formed by the plies V1 and V2 with the superabsorbent material interposed is embossed between the pressure roller 17 and the first embossing roller 19. In the nip between the rollers 19 and 21 the protuberances of the two rollers 19 and 21 can coincide at least in part and the distance between the rollers can be such as to cause compression, i.e. lamination, of the plies V1, V2 and V3 between corresponding protuberances of the two rollers 19 and 21. In this case a so-called tip-to-tip embossed product is obtained. Reciprocal adhesion of the assembly formed by the plies V1 and V2 and by the ply V3 is guaranteed by applying a glue on the protuberances formed on the ply V3 by the points or protuberances of the embossing roller 21. This glue is applied by a glue dispenser 25 analogous in concept to the glue dispenser 9 described previously.

Instead of a tip-to-tip laminating unit it is possible to use (as shown in the diagram), a nested type embossing-laminating unit. In this case, the protuberances of the two embossing rollers 19, 21 are distanced and/or reciprocally phased so that there is no pressure between the embossing rollers in the nip defined therebetween. The plies V1, V2 and V3 embossed as described above pass through the nip formed by the rollers 19 and 21 and are laminated therebetween in a lamination area formed between the second embossing roller 21 and a laminating roller 27 positioned downstream of the nip between the rollers 19, 21. In this case a product with nested embossing is obtained. Reciprocal adhesion between the group of plies V1, V2 with the superabsorbent material interposed and the ply V3 is again guaranteed by the glue applied by the dispensing unit 25.

Both the tip-to-tip and nested configurations of the embossing-laminating unit 3 are known per se and do not require to be described in more detail. It is also known that the same embosser-laminator 3 can have an adjustable configuration so that it can operate alternatively in tip-to-tip or nested mode.

In a modified embodiment of the system according to the invention the glue dispenser 9 can be replaced by a "lotion applicator", that is, a device capable of applying products other than glue, such as a softening lotion. Lotion applicators are known per se and conventionally already used applied to single-ply or multi-ply paper materials, for example to produce cleansing wipes. In this case the path of the ply V1 can be the one indicated in FIG. 1, to receive the superabsorbent material, or alternatively said ply can by-pass the applicator means of the superabsorbent material and be fed from the counter-pressure roller 13 directly around the tensioning unit 14 and from here to the embossing-laminating unit. This alternative path can be followed when the lotion applicator which replaces the glue dispensing unit 9 applies a lotion and superabsorbent powders are consequently not added to the product obtained. The system with this configuration is a dual system that can be used to produce products of different types.

FIG. 2 schematically represents a cross section, greatly enlarged, of a portion of a multi-ply product obtained with the present invention and indicated as a whole with N. It can be seen in the schematic section in FIG. 2 that the plies V1 and V2 define an intermediate area or interface in which the superabsorbent material indicated with S is contained. In substance, a layer, which can be continuous or discontinuous and contains the superabsorbent powders, is formed between the plies V1 and V2. These can also be applied in combination with products or additives of other types, such as fillers, or the like. In general, it is advantageous that the superabsorbent powders and any fillers or other additives are distributed in a composite sheet of a substantially constant thickness, to facilitate subsequent winding or cutting and folding and packaging and, consequently, to obtain a product of greater aesthetic value and devoid of defects in form.

P1 indicates the protuberances formed by the embossing-laminating unit 3 on the assembly formed by the coupled plies V1 and V2. These plies have been previously and reciprocally glued by means of the glue applied by the dispenser 9, said glue also having the function of bonding the powders of superabsorbent material S at least in part to the ply V1.

The ply V3 is embossed with protuberances P3 formed by the embossing-laminating unit by means of the second embossing roller 21. In FIG. 2 the multi-ply web article N is of the tip-to-tip type and therefore the protuberances P1 coincide at least in part with the protuberances P3. Applied between these protuberances is the glue C which reciprocally joins the ply V3 to the assembly of plies V1, V2.

FIG. 3 represents, once again in a schematic and greatly enlarged view, the cross section of a multi-layer article or product, again indicated with N, obtained with a configuration of the embossing-laminating unit 3 of the nested type. The same numbers are used to indicate the same or equivalent parts to those in FIG. 2. It can be seen in this case that the protuberances P1 are intercalated between the protuberances P3 with a nested arrangement.

The plies V1, V2 and V3 can advantageously have a grammage (i.e. weight per surface unit) ranging from 10 to 100 g/m$^2$. Preferably, the total grammage of the article, inclusive of the superabsorbent powders, is between 10 and 100 g/m$^2$ and even more preferably between 20 and 80 g/m$^2$.

The superabsorbent material or product in powder form, which is distributed in the section 1 of the system, can be a superabsorbent polymer of a type known per se. Examples of superabsorbent polymers that can be used for this purpose are: crosslinked sodium polyacrylate polymers; polymers originating or deriving from cellulose.

Nonetheless, according to a preferred embodiment of the invention, also in view of the intended use of the end product, the superabsorbent material is suitable for use with food, that is, it is not dangerous if inhaled or ingested. Suitable for use with food, or edible, means that this material is suitable to come into contact with foods. In this way, the end product can be used without contraindications also as kitchen paper, for example in domestic use, to clean kitchen worktops, dishes, or the like, as absorbent paper for use in cooking (to absorb oils from fried foods or the like), and also to produce absorbent sheets to be inserted in food packaging, inside trays intended to hold meat, fish or other food products that release liquids.

Examples of superabsorbent products suitable for use with foods, or edible, in the sense indicated above are: polymers deriving from carboxymethylcellulose with degree of crosslinking from low to high; or association polymers, i.e. capable of creating interactions between molecules that cannot be represented by means of a bond.

Tests performed showed that the absorption power of the end product initially increases as the quantity of superabsorbent materials contained therein increases; having reached a quantity of approximately 1.0 g/m$^2$ the absorption power is maximum, after which it decreases if the quantity of superabsorbent material inserted between the plies is increased. This is because, to be able to expand and absorb the maximum, the particles of superabsorbent material require space between them and said space is limited by an excessive number of superabsorbent particles.

According to a preferred embodiment of the invention, therefore, the quantity of superabsorbent material distributed is greater than 0 g/m$^2$ but preferably equal to or below 4 g/m$^2$. More preferably, the quantity of said materials distributed per unit of surface is less than 2.4 g/m$^2$ and even more preferably between 0.4 and 1.2 g/m$^2$.

In the above and according to FIG. 1, the superabsorbent powders distributed on the face of the ply V1 which comes into contact with the ply V2, in the case of a multi-ply, are made to adhere at least in part using a glue. Nonetheless, it would also be possible for these powders to be constrained at least temporarily until reaching the embossing and laminating area of the embossing-laminating unit 3 without applying glue. This is the case, for example, when the powders of superabsorbent materials are particularly fine and remain trapped, through suction, between the fibers forming the ply V1.

Although in the examples shown in FIG. 1 a glue dispenser 9 with a roller distributor 11 has been used, it would also be possible to distribute or apply the glue on the ply V1 in a different way. For example, the glue could be sprayed, or also applied with systems of another type.

The glue used can be chosen, for example, from the group comprising a solution of synthetic resins or an aqueous solution of synthetic polymers.

According to a particularly advantageous embodiment of the invention, the glue is a hot-melt resin and according to a preferred embodiment of the invention it is based on ethylene vinyl acetate.

According to a possible embodiment of the invention, the glue itself contains particles of powders or granules of superabsorbent materials. In this case all the superabsorbent material applied to the article can be contained in the glue, in which case the applicator means of the superabsorbent material will be formed by said glue dispenser 9. In this case, the suction roller 5, the distributor 7 and any other accessories for distribution of the superabsorbent powders can be omitted or deactivated. The ply V2 is coupled with the ply V1, for example, in the area of the counter-pressure roller 13.

However, it would also be possible for the superabsorbent material to be in part mixed in the glue and in part applied in dry state by applicator means such as the roller 5 and the device 7 or analogous applicator means with the same function. In this case, part of the superabsorbent material is made to adhere to the ply V1 during application of the glue, and a further dose of superabsorbent material is distributed in a subsequent phase and constrained to the ply V1 by means of the glue previously applied and which also contains part of the superabsorbent material.

The use of glues mixed with superabsorbent materials is known per se (see P. Zoromski, <<*The Development and Advantages of Absorbent Hot Melt*>>, in *Nonwovens World*, February-March 2004, page 63 and ff), although in relation to the production of sanitary napkins, baby diapers and other similar articles, and not in relation to the production of thin articles made of tissue paper, such as toilet paper, kitchen paper, paper napkins or handkerchiefs and equivalent products, to which the present invention relates.

According to a possible embodiment of the invention, the embossing-laminating unit 3 or other unit equivalent alternative or in addition to the unit 3 can perform embossing in such a way as to form an additional barrier against lateral spillage of the powders of superabsorbent material included in the space between the plies V1 and V2.

It is understood that the drawing only shows an example provided purely as a practical embodiment of the invention, which may vary in forms and arrangements without however departing from the scope of the concept on which the invention is based.

The invention claimed is:

1. A system for producing a multi-ply web article comprising in combination: a dispenser constructed and arranged to dispense a superabsorbent material in powder form on a first ply of tissue paper, including a superabsorbent powder applicator; at least a first path and a second path for at least said first ply and a second ply, respectively, and a joining arrangement to join said first ply and said second ply and to produce a finished multi-ply tissue paper article, wherein said applicator comprises a device which forms a storage chamber in which particles of said superabsorbent material are held in suspension in a flow of air, wherein said device is associated with a suction roller, said first ply being fed around said roller and passing through said chamber to receive the superabsorbent material.

2. A system for producing a web article comprising a dispenser constructed and arranged to dispense a superabsorbent material in powder form on a first ply of tissue paper, said system including a superabsorbent powder applicator comprising a device which forms a storage chamber in which particles of said superabsorbent material are held in suspension in a flow of air, wherein said device is associated with a suction roller, said first ply being fed around said roller and passing through said chamber to receive the superabsorbent material.

3. A system for producing a multi-ply web article comprising in combination: a dispenser constructed and arranged to dispense a superabsorbent material in powder form on a first ply of tissue paper, including a superabsorbent powder applicator; at least a first path and a second path for at least said first ply and a second ply, respectively, and a joining arrangement to join said first ply and said second ply and to produce a finished multi-ply tissue paper article, wherein said applicator comprises a cyclone device associated with a suction roller, said cyclone device defining at least a suspension chamber for the superabsorbent material in powder form, said first ply being fed around said roller and passing through said chamber to receive the superabsorbent material.

4. The system as claimed in claim 3, further including an embossing unit to emboss and join the first ply on which the superabsorbent material has been distributed to at least said second ply.

5. The system as claimed in claim 3, wherein said second path for said second ply is positioned to couple said second ply with said first ply with the superabsorbent material positioned between the first ply and the second ply, and is associated with said dispenser for distribution of the superabsorbent material.

6. The system as claimed in claim 3, wherein a glue dispenser is associated with said dispenser for distribution of the superabsorbent material, to apply a glue to a first surface of said first ply.

7. The system as claimed in claim 3, wherein said dispenser for distribution of the superabsorbent material is structured to distribute the superabsorbent material over an entire width of the first ply.

8. The system as claimed in claim 3, wherein said dispenser is constructed and arranged to distribute the superabsorbent material over a width of said first ply leaving one or more longitudinal strips devoid of the superabsorbent material.

9. The system as claimed in claim 3, further including a rewinding machine to wind the article into logs, said rewinding machine being positioned downstream of said embossing unit.

10. The system as claimed in claim 3, wherein said applicator is constructed and arranged to distribute said superabsorbent material continuously along a longitudinal extension of the first ply.

11. The system as claimed in claim 3, further comprising a lotion applicator unit associated with said dispenser for distribution of the superabsorbent material, to alternatively apply a glue or a lotion, and wherein an alternative path is provided for the first ply which passes outside an area in which said applicator acts.

12. A system for producing a web article comprising a dispenser constructed and arranged to dispense a superabsorbent material in powder form on a first ply of tissue paper, said system including a superabsorbent powder applicator, wherein said applicator comprises a cyclone device associated with a suction roller, said cyclone device defining at least a suspension chamber for the superabsorbent material in powder form, said first ply being fed around said roller and passing through said chamber to receive the superabsorbent material.

13. The system as claimed in claim 12, wherein a path for a second ply, positioned to couple said second ply with said first ply with the superabsorbent material positioned between the first ply and the second ply, is associated with said dispenser for distribution of the superabsorbent material.

14. The system as claimed in claim 12, wherein a glue dispenser is associated with said dispenser for distribution of the superabsorbent material, to apply a glue to a first surface of said first ply.

15. The system as claimed in claim 12, wherein said dispenser for distribution of the superabsorbent material is structured to distribute the superabsorbent material over an entire width of the first ply.

16. The system as claimed in claim 12, wherein said dispenser is constructed and arranged to distribute the superabsorbent material over a width of said first ply leaving one or more longitudinal strips devoid of the superabsorbent material.

17. The system as claimed in claim 12, further including a rewinding machine to wind the article into logs, said rewinding machine being positioned downstream of said embossing unit.

18. The system as claimed in claim 17, further comprising a severing machine to divide each log into a plurality of rolls, said severing machine being positioned downstream of said rewinding machine.

19. The system as claimed in claim 12, wherein said applicator is constructed and arranged to distribute said superabsorbent material continuously along a longitudinal extension of the first ply.

20. The system as claimed in claim 12, further including a lotion applicator unit associated with said dispenser for distribution of the superabsorbent material, to alternatively apply a glue or a lotion, and wherein an alternative path is provided for the first ply which passes outside an area in which said applicator acts.

* * * * *